United States Patent
Matsumoto et al.

(10) Patent No.: US 7,508,996 B2
(45) Date of Patent: Mar. 24, 2009

(54) IMAGE PROCESSING APPARATUS AND IMAGE PROCESSING METHOD

(75) Inventors: Atsushi Matsumoto, Tokyo (JP); Ritsuko Otake, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 10/944,017

(22) Filed: Sep. 17, 2004

(65) Prior Publication Data
US 2005/0074184 A1    Apr. 7, 2005

(30) Foreign Application Priority Data
Oct. 1, 2003  (JP)  ............... 2003-343566

(51) Int. Cl.
*G06K 9/36*  (2006.01)
(52) U.S. Cl. ............... 382/284; 345/629; 345/641; 358/2.1; 358/1.13
(58) Field of Classification Search .............. 382/284
See application file for complete search history.

(56) References Cited

U.S. PATENT DOCUMENTS

| | | | | |
|---|---|---|---|---|
| 4,547,811 A * | 10/1985 | Ochi et al. | ............... | 382/176 |
| 4,707,745 A * | 11/1987 | Sakano | ............... | 358/2.1 |
| 4,953,013 A * | 8/1990 | Tsuji et al. | ............... | 358/530 |
| 4,996,603 A * | 2/1991 | Kanemitsu et al. | ............... | 358/462 |
| 5,550,647 A * | 8/1996 | Koike | ............... | 358/3.03 |
| 5,663,809 A * | 9/1997 | Miyaza et al. | ............... | 358/450 |
| 5,724,158 A * | 3/1998 | Koike | ............... | 358/462 |
| 5,920,657 A * | 7/1999 | Bender et al. | ............... | 382/284 |
| 5,974,198 A * | 10/1999 | Hamburg et al. | ............... | 382/284 |
| 6,016,356 A * | 1/2000 | Ito et al. | ............... | 382/132 |
| 6,185,342 B1 * | 2/2001 | Hamburg et al. | ............... | 382/284 |
| 6,272,634 B1 * | 8/2001 | Tewfik et al. | ............... | 713/176 |
| 6,275,620 B2 * | 8/2001 | de Queiroz et al. | ............... | 382/270 |
| 6,333,998 B1 * | 12/2001 | Matsumoto | ............... | 382/217 |
| 6,437,881 B1 * | 8/2002 | Baba et al. | ............... | 358/434 |
| 6,522,789 B2 * | 2/2003 | Takahashi et al. | ............... | 382/284 |
| 6,549,681 B1 * | 4/2003 | Takiguchi et al. | ............... | 382/294 |
| 6,715,127 B1 * | 3/2004 | Eschbach et al. | ............... | 715/202 |
| 6,834,124 B1 * | 12/2004 | Lin et al. | ............... | 382/261 |
| 6,859,236 B2 * | 2/2005 | Yui | ............... | 348/584 |
| 7,088,375 B1 * | 8/2006 | Hamburg | ............... | 345/629 |
| 7,277,191 B2 * | 10/2007 | Metcalfe et al. | ............... | 358/1.12 |
| 7,292,372 B2 * | 11/2007 | Fukuda et al. | ............... | 358/2.1 |
| 7,379,595 B2 * | 5/2008 | Li et al. | ............... | 382/180 |
| 7,409,104 B2 * | 8/2008 | Vitsnudel et al. | ............... | 382/284 |
| 2002/0003633 A1 | 1/2002 | Matsumoto | | |
| 2003/0233379 A1 * | 12/2003 | Cohen et al. | ............... | 707/200 |

(Continued)

*Primary Examiner*—Matthew C. Bella
*Assistant Examiner*—Sath V. Perungavoor
(74) *Attorney, Agent, or Firm*—Canon U.S.A. Inc., I.P. Division

(57) ABSTRACT

An image processing apparatus includes: image inputting portions for inputting a plurality of images; attribute inputting portions for inputting attribute information for the plurality of images; and an image combining processor for combining the plurality of images in accordance with an image combining ratio to generate a combined image. The image processing apparatus further includes: an attribute-information combining-ratio determining section for determining an attribute-information combining ratio for the plurality of images in accordance with the image combining ratio; an attribute-information combining processor for combining the attribute information for the plurality of images in accordance with the attribute-information combining ratio to generate combined attribute information; and an image processor for processing the combined image by switching image-processing in accordance with the combined attribute information.

14 Claims, 2 Drawing Sheets

U.S. PATENT DOCUMENTS

| | | | |
|---|---|---|---|
| 2004/0027615 A1* | 2/2004 | Okuyama | 358/2.1 |
| 2004/0042687 A1* | 3/2004 | Curry et al. | 382/302 |
| 2004/0052421 A1* | 3/2004 | Curry et al. | 382/243 |
| 2004/0052427 A1* | 3/2004 | Curry et al. | 382/256 |
| 2004/0114832 A1* | 6/2004 | Ebner et al. | 382/298 |
| 2004/0227758 A1* | 11/2004 | Curry et al. | 345/426 |
| 2004/0246533 A1* | 12/2004 | Touura | 358/461 |
| 2005/0074184 A1* | 4/2005 | Matsumoto et al. | 382/284 |
| 2005/0162702 A1* | 7/2005 | Lee et al. | 358/2.1 |
| 2005/0273578 A1* | 12/2005 | Li et al. | 712/216 |

* cited by examiner

FIG. 3
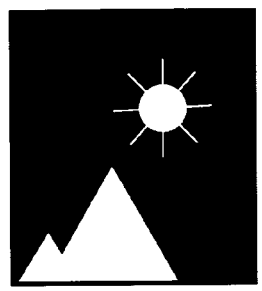
FIG. 4A    FIG. 4B    FIG. 4C
 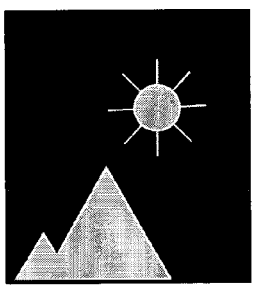 
FIG. 5
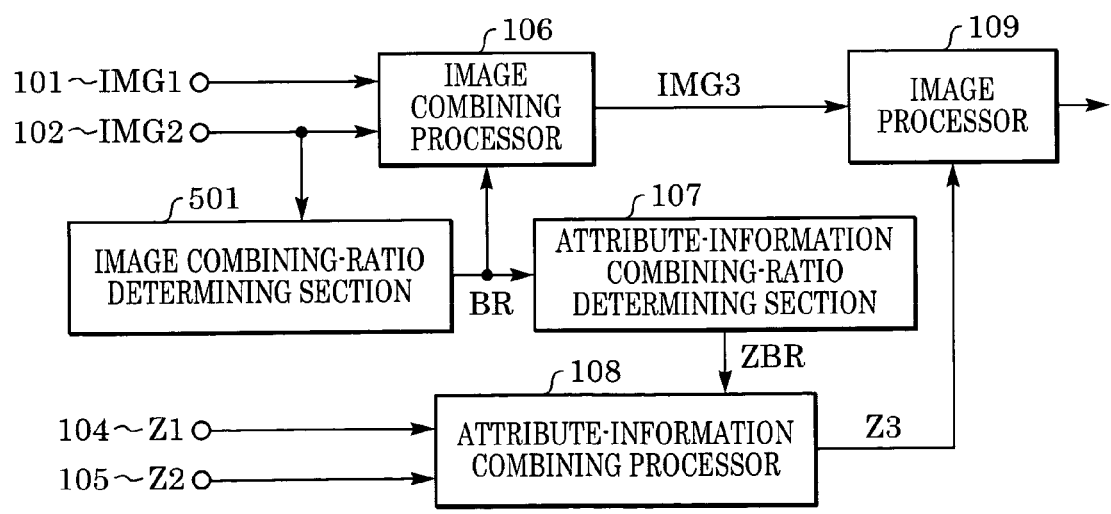

_(54)_ IMAGE PROCESSING APPARATUS AND IMAGE PROCESSING METHOD

CROSS REFERENCE TO RELATED APPLICATIONS

This application claims priority from Japanese Patent Application No. 2003-343566 filed Oct. 1, 2003, which is hereby incorporated by reference herein.

BACKGROUND OF THE INVENTION

1. Field of the Invention

The present invention relates an image processing apparatus and an image processing method for combining images.

2. Description of the Related Art

Conventionally, an image processing apparatus that combines a plurality of images has been available to generate a single image. For combining a plurality of images, such an image processing apparatus discards attribute information attached to the original images or selects the attribute information of one of the images.

However, when the attribute information is processed as described above, optimum attribute information is not supplied to a combined image. This makes it impossible to switch processing for optimum image processing in accordance with attribute information.

SUMMARY OF THE INVENTION

The present invention has been made in view of the foregoing problem. The present invention makes it possible to perform optimum image processing on a combined image in accordance with attribute information.

To achieve the foregoing, an aspect of the present invention provides an image processing apparatus. The image processing apparatus includes: image inputting portions for inputting a plurality of images; attribute inputting portions for inputting attribute information for the plurality of images; and an image combining processor for combining the plurality of images in accordance with the image combining ratio to generate a combined image. The image processing apparatus further includes: an attribute-information combining-ratio determining section for determining an attribute-information combining ratio for the plurality of images in accordance with the image combining ratio; an attribute-information combining processor for combining the attribute information for the plurality of images in accordance with the attribute-information combining ratio to generate combined attribute information; and an image processor for processing the combined image by switching image-processing in accordance with the combined attribute information.

The image processing apparatus may further include an image combining-ratio determining section for generating the image combining ratio for the plurality of images. Alternatively, the image processing apparatus may further comprise an image combining ratio input portion for inputting the image combining ratio for the plurality of images.

The image combining ratio may be based on any of the plurality of images. Data of the any of the plurality of images may be digitized using a predetermined threshold to generate the image combined ratio.

The attribute-information combining-ratio determining section may digitize the image combining-ratio by using a predetermined threshold to determine the attribute-information combining ratio.

Another aspect of the present invention provides an image processing method. The image processing method includes: inputting a plurality of images; obtaining an image combining ratio for the plurality of images; and combining the plurality of images in accordance with the image combining ratio to generate a combined image. The image processing method further includes: determining an attribute-information combining ratio for the plurality of images in accordance with the image combining ratio; combining the attribute information for the plurality of images in accordance with the attribute-information combining ratio to generate combined attribute information; and processing the combined image by switching image-processing in accordance with the combined attribute information.

Another aspect of the present invention provides a program for executing the image processing method described above.

Another aspect of the present invention provides a computer-readable storage medium in which the program described above is stored.

Further features and advantages of the present invention will become apparent from the following description of the preferred embodiments with reference to the attached drawings.

BRIEF DESCRIPTION OF THE DRAWINGS

FIG. 3 is a view for showing an attribute-information combining ratio in accordance with the first embodiment.

FIGS. 4A to 4C are views for showing attribute-information combining processing in accordance with the first embodiment.

FIG. 5 is a block diagram of the configuration of an image processing apparatus according to a second embodiment of the present invention.

DESCRIPTION OF THE EMBODIMENTS

Exemplary embodiments for carrying out the present invention are described below in detail with reference to the attached drawings.

First Embodiment

Figure 1:
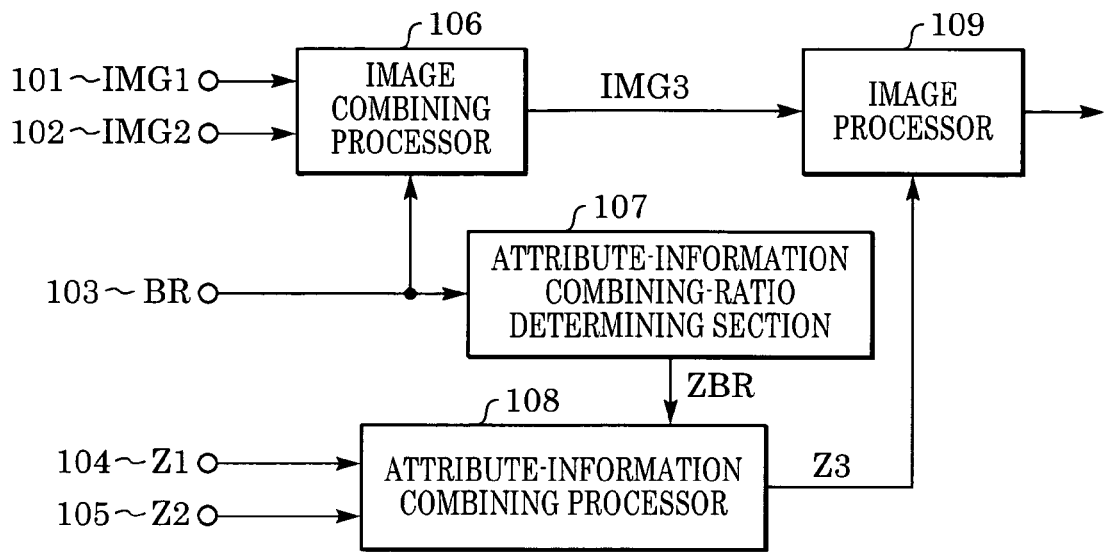
FIG. 1 is a block diagram of the configuration of an image processing apparatus according to a first embodiment of the present invention.

FIG. 1 is a block diagram showing the configuration of an image processing apparatus according to a first embodiment of the present invention.

Referring to FIG. 1, an image signal IMG1 is input to an input portion 101. An image signal IMG2 is input to an input portion 102. An image-combining ratio data BR is input to an input portion 103. Attribute-information data Z1 for the image signal IMG1 is input to an input portion 104. Attribute-information data Z2 for the image signal IMG2 is input to an input portion 105. Using the image-combining ratio data BR, an image combining processor 106 performs image-combining processing on the image signals IMG1 and IMG2 to generate combined image data IMG3. In accordance with the image-combining ratio data BR, an attribute-information combining-ratio determining section 107 determines attribute-information combining-ratio data ZBR to be applied to the attribute-information data Z1 and Z2. In accordance with the combining-ratio data ZBR for the attribute-information data Z1 and Z2, an attribute-information combining processor 108 performs processing for combining the attribute-information data Z1 and Z2 to generate combined attribute-information data Z3. In accordance with the combined attribute-information data Z3, an image processor 109 switches parameters for processing to be performed on the combined image data IMG3 and performs image processing suitable for the image attribute. In the first embodiment, the image processor 109 serves as a screen processor, as an example of an image processor. Processing performed by the image processor 109 is not limited to screen processing, and thus may be any processing for optimizing processing using combined attribute-information data.

Figure 2A:
FIGS. 2A to 2D are views for showing image-combining processing in accordance with the first embodiment.
Figure 2B:
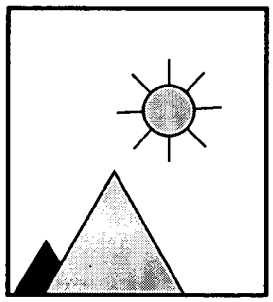
Figure 2C:
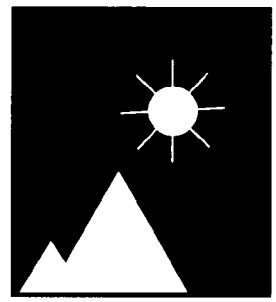
Figure 2D:

FIGS. 2A to 2D are views for illustrating image-combining processing according to the first embodiment. An image shown in FIG. 2A is based on the image signal IMG1 and is a text (character) image in this case. An image shown in FIG. 2B is based on the image signal IMG2 and includes the sun and pyramids. In exemplary embodiments, each of the image signals IMG1 and IMG2 is an 8-bit signal and has 256 gradations from 0 to 255 levels per pixel. FIG. 2C shows a conceptual image for the image-combining ratio data BR. In exemplary embodiments, the image-combining ratio data BR is also an 8-bit signal that is capable of indicating the combining ratio in 0 to 255 levels per pixel. In the example shown in FIG. 2C, however, for ease of illustration, the image is expressed with two ratios, namely, black for BR=0 and white for BR=255. An image shown in FIG. 2D is an image provided by the combined image data IMG3 combined in accordance with the image-combining ratio data BR.

The operation of the image processing apparatus in the first embodiment is described next.

As described above, the image signal IMG1 is input to the input portion 101 and the image signal IMG2 is input to the input portion 102. The image-combining ratio data BR is input to the input portion 103. In accordance with the image-combining ratio data BR, the image combining processor 106 performs image-combining processing on the image signals IMG1 and IMG2 to generate the combined-image data IMG3 through the use of Equation (1) below:

$$IMG3(ij)=(IMG1(ij)*(255-BR(ij))+IMG2(ij)*BR(ij))/255 \quad (1)$$

where (ij) indicates the position of each pixel, with i indicating a horizontal pixel position and j indicating a vertical pixel position. As can be understood from Equation (1), when $BR(ij)$ is 0, image signal values of $IMG1(ij)$ are used as an image signal for the pixel position (ij) of the combined image data IMG3, and when $BR(ij)$ is 255, signal values of $IMG2(ij)$ are used as an image signal for the pixel position (ij) of the combined image data IMG3. Also, when $BR(ij)$ is 128, half of the signal values of the image signal IMG1 and half of the signal values of the image signal IMG2 are added together and the resulting values are used as an image signal.

In the example shown in FIG. 2C, for the image-combining ratio data BR, portions corresponding to the sun and the pyramids in the image that is shown in FIG. 2B and that is provided by the image signal IMG2 have a value of 255 (i.e., white) and other portions have a value of 0 (i.e., black). Thus, from Equation (1), signal values of $IMG2(ij)$ are used for the portions where $BR(ij)$ is 255 and signal values of $IMG1(ij)$ are used for the other portions to provide combined image data, thereby providing the combined image shown in FIG. 2D.

The combined-image data IMG3 obtained as described above is sent to the image processor 109.

On the other hand, the image-combining ratio data BR is also input to the attribute-information combining-ratio determining section 107 in which the attribute-information combining-ratio data ZBR is determined. FIG. 3 shows an image for the attribute-information combining-ratio data ZBR, which is determined in accordance with the image-combining ratio data BR for the image shown in FIG. 2C. The attribute-information combining-ratio data ZBR is determined based on Condition (2) below.

If $BR(ij)>TH0$, $ZBR(ij)=255$

If $BR(ij) \leq TH0$, $ZBR(ij)=0$ \quad (2)

where TH0 indicates a threshold. Thus, the image-combining ratio data BR is digitized into binary data of 255 or 0. Since the image-combining ratio data BR shown in FIG. 2C in the first embodiment is binary data of 255 or 0, when TH0 is a value between 0 and 254, the attribute-information combining-ratio data ZBR is the same as the image-combining ratio data BR. While the attribute-information combining-ratio data ZBR in this case is expressed by 0 and 255 as the binary data, it can also be expressed by 1-bit data with 0 and 1.

In accordance with the attribute-information combining-ratio data ZBR, the attribute-information combining processor 108 combines the attribute-information data Z1 for the image signal IMG1 with the attribute-information data Z2 for the image signal IMG2 to generate the combined attribute-information data Z3.

As described above, through the digitization, the attribute-information combining-ratio data ZBR is converted into binary data that indicates either 255 or 0. The attribute-information data Z2 is used for 255 (i.e., white portions in FIG. 3) and the attribute-information data Z1 is used for 0 (i.e., black portions in FIG. 3) to generate the combined attribute-information data Z3.

FIGS. 4A to 4C are views for illustrating processing performed by the attribute-information combining processor 108. An image shown in FIG. 4A is a conceptual image for the attribute-information data Z1 for the image signal IMG1. An image shown in FIG. 4B is a conceptual image for the attribute-information data Z2 for the image signal IMG2. An image shown in FIG. 4C is a conceptual image for the combined attribute-information data Z3.

In FIGS. 4A to 4C, the white portions have a "text" attribute, the halftone portions have an "image" attribute, and each black portion represents a ground where nothing is rendered. The attribute data is 2-bit data in which "0" indicates a ground (i.e., a black portion), "1" indicates an image attribute (i.e., a halftone portion), "2" indicates a text attribute (i.e., a white portion), and "3" is undefined.

As shown in FIG. 4A, with the attribute-information data Z1, a portion where a character is rendered has a text attribute ("2", white) and the other portions indicate a ground ("0", black). As shown in FIG. 4B, with the attribute-information data Z2, portions where the sun and the pyramids are rendered have an "image" attribute ("1", halftone) and the other portion indicates a ground ("0", black). As shown in FIG. 4C, with the attribute-information data Z3, the attribute-information signal values of the attribute-information data Z1 are used for the black portion in FIG. 3 and the attribute-information signal values of the attribute-information data Z2 are used for the white portions in FIG. 3.

Comparison between the combined attribute-information data Z3 combined as described and illustrated in FIG. 4C and the combined-image data IMG3 illustrated in FIG. 2D shows that portions where characters are rendered have the character attribute, portions where images are rendered have the image attribute, and the other portions indicate a ground.

The combined attribute-information data Z3 generated by the attribute-information combining processor 108 is sent to the image processor 109.

The image processor 109 performs screen processing, as described above. The image processor 109 has two screens, namely, a screen for a character and a screen for an image and is configured to switch between the two screens in accordance with the combined attribute-information data Z3. The image processor 109 digitizes the combined-image data IMG3 by using either of the screens that is suitable for the attribute of each pixel. For example, for pixels having an image attribute for which halftone stability is important in a printer using an electrophotographic process or the like, it is desirable to digitize image data using a coarse screen pattern so that signals are concentrated at highlighted portions. On the other hand, for pixels having a character attribute, it is desirable to improve the readability of low-contrast text using a fine screen pattern, while compromising the halftone stability.

As described above, in the first embodiment, respective attribute information of images are combined to generate combined attribute information that is suitable for a combined image. This arrangement, therefore, makes it possible to switch processing for combining the images in accordance with the attribute. That is, in accordance with the attribute of each pixel, processing is selectively switched such that processing for a character is performed on a pixel having a text attribute and processing for an image is performed on a pixel having an image attribute, thereby improving the image quality.

Second Embodiment

FIG. 5 is a block diagram showing the configuration of an image processing apparatus according to a second embodiment of the present invention.

In the second embodiment, the input portion 103 (shown in FIG. 1) for the combining-ratio data BR is replaced with an image combining-ratio determining section 501. Since the other sections have the same configurations as those shown in FIG. 1 and described above, they are denoted with the same reference numerals and the descriptions thereof are not described in further detail here. The image combining-ratio determining section 501 receives an image signal IMG2 from input portion 102 and uses Condition (3) below to determine image-combining ratio data BR.

If $IMG2(ij) > TH1$, $BR(ij) = 255$

If $IMG2(ij) \leq TH1$, $BR(ij) = 0$ \quad (3)

where TH1 indicates a threshold.

When the image signal IMG2 has data for an image as shown in FIG. 2B, for example, digitizing the image signal IMG2 for TH1=50 yields an image for the image-combining ratio data BR as shown in FIG. 2C.

Since the other processing is analogous to that in the first embodiment, the description thereof is omitted here.

Thus, the second embodiment can provide the same advantages as the first embodiment.

Even though the descriptions of the first and second embodiments have been given in a case in which two images are combined, the present invention is readily applicable to a case in which three or more images are combined. In such a case, two or more parameters are appropriately used for the image combining-ratio data, and it is preferable that data for selecting the attribute information of an image having the highest image combining ratio is generated as the attribute-information combining-ratio data ZBR.

Other Embodiments

The above-described embodiments of the present invention can be achieved by supplying a storage medium (or recording medium) storing software-program code for realizing the features of the illustrated embodiments to a system or apparatus so that a computer (or central processing unit (CPU) or micro-processing unit (MPU)) of the system or apparatus reads and executes the program code. In such a case, the program code that is read from the storage medium achieves the features of the embodiments and the storage medium in which the program code is stored is also encompassed by the present invention. Further, not only is the program code that is read from the computer executed to achieve the features of the illustrated embodiments, but also an operating system (OS) or the like that is running on the computer may perform part or all of the actual processing in accordance with an instruction of the program code to achieve the features of the illustrated embodiment. Examples of the storage medium for storing the program code include a flexible disk, hard disk, read-only memory (ROM), random-access memory (RAM), magnetic tape, nonvolatile memory card, compact disk—ROM (CD-ROM), compact disk—recordable (CD-R), digital versatile disk (DVD), optical disk, magneto-optical disk, and magneto-optical (MO). Computer networks, such as a local area network (LAN) and a wide area network (WAN) can be used to supply the program code.

Additionally, after the program code that is read from the storage medium is stored in a memory that is provided in a plug-in card inserted into the computer or an expansion section connected to the computer, a CPU or the like that is provided in the plug-in card or the expansion section may perform part or all of the actual processing in accordance with instructions of the program code to achieve the features of the illustrated embodiments.

The present invention makes it possible to output an image as intended by a user who desires to output a combined image corresponding to the color mode of an input image. In addition, the present invention makes it possible to output a combined image that is faithful to an output color mode desired by the user through the use of combined color mode priority setting.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
    image inputting means for inputting a first image signal and a second image signal;
    attribute inputting means for inputting first attribute information representing an attribute of the first image signal and second attribute information representing an attribute of the second image signal, each of the first attribute information and the second attribute information including at least one of a text attribute and an image attribute;

image combining means for combining the first image signal and the second image signal in accordance with an image combining ratio for the first image signal and the second image signal to generate a combined image signal;

attribute-information combining-ratio determining means for determining an attribute-information combining ratio for the first attribute information and the second attribute information in accordance with the image combining ratio;

attribute-information combining means for combining the first attribute information and the second attribute information in accordance with the attribute-information combining ratio to generate combined attribute information;

image processing means for processing the combined image signal by switching image-processing in accordance with the combined attribute information; and wherein the attribute-information combining-ratio determining means digitizes the image combining ratio by using a predetermined threshold to determine the attribute-information combining ratio.

2. The image processing apparatus according to claim 1, further comprising image combining ratio generating means for generating the image combining ratio for the first image signal and the second image signal.

3. The image processing apparatus according to claim 1, further comprising image combining ratio input means for inputting the image combining ratio for the first image signal and the second image signal.

4. The image processing apparatus according to claim 1, wherein the image combining ratio is based on any of the first image signal and the second image signal.

5. The image processing apparatus according to claim 4, wherein data of any of the first image signal and the second image signal is digitized using a predetermined threshold to generate the image combining ratio.

6. An image processing apparatus comprising:
image inputting portions configured to input a first image signal and a second image signal;
attribute inputting portions configured to input first attribute information representing an attribute of the first image signal and second attribute information representing an attribute of the second image signal, each of the first attribute information and the second attribute information including at least one of a text attribute and an image attribute;
an image combining processor configured to combine the first image signal and the second image signal in accordance with an image combining ratio for the first image signal and the second image signal to generate a combined image signal;
an attribute-information combining-ratio determining section configured to determine an attribute-information combining ratio for the first attribute information and the second attribute information in accordance with the image combining ratio;
an attribute-information combining processor configured to combine the first attribute information and the second attribute information in accordance with the attribute-information combining ratio to generate combined attribute information;
an image processor configured to process the combined image signal by switching image-processing in accordance with the combined attribute information; and wherein the attribute-information combining-ratio determining section is configured to digitize the image combining-ratio by using a predetermined threshold to determine the attribute-information combining ratio.

7. The image processing apparatus according to claim 6, further comprising an image combining-ratio determining section configured to generate the image combining ratio for the first image signal and the second image signal.

8. The image processing apparatus according to claim 6, further comprising an image combining ratio input portion configured to input the image combining ratio for the first image signal and the second image signal.

9. The image processing apparatus according to claim 6, wherein the image combining ratio is based on any of the first image signal and the second image signal.

10. The image processing apparatus according to claim 9, wherein data of any of the first image signal and the second image signal is digitized using a predetermined threshold to generate the image combined ratio.

11. A computer implemented image processing method comprising:
inputting a first image signal and the second image signal;
inputting first attribute information representing an attribute of the first image signal and second attribute information representing an attribute of the second image signal, each of the first attribute information and the second attribute information including at least one of a text attribute and an image attribute;
obtaining an image combining ratio for the first image signal and the second image signal;
combining the first image signal and the second image signal in accordance with the image combining ratio for the first image signal and the second image signal to generate a combined image signal;
determining an attribute-information combining ratio for the plurality for first attribute information and the second attribute information in accordance with the image combining ratio;
combining the first attribute information and the second attribute information in accordance with the attribute-information combining ratio to generate combined attribute information;
processing the combined image signal by switching image-processing in accordance with the combined attribute information; and
wherein determining the attribute-information combining ratio for the first image signal and the second image signal comprises determining the attribute-information combining ratio for the first image signal and the second image signal by digitizing the image combining ratio using a predetermined threshold.

12. The image processing method according to claim 11, wherein the image combining ratio is based on any of the first image signal and the second image signal.

13. The image processing method according to claim 12, wherein the image combining ratio is generated by digitizing data of any of the first image signal and the second image signal using a predetermined threshold.

14. A computer-readable storage medium having computer-executable instructions stored thereon for causing a computer to execute the image processing method according to claim 11.

* * * * *